United States Patent
Tione

(10) Patent No.: US 11,820,347 B2
(45) Date of Patent: Nov. 21, 2023

(54) ELECTRONIC-PNEUMATIC BRAKING CONTROL SYSTEM FOR EMERGENCY AND SERVICE BRAKING FOR AT LEAST ONE VEHICLE

(71) Applicant: FAIVELEY TRANSPORT ITALIA S.P.A., Piossasco (IT)

(72) Inventor: Roberto Tione, Lauriano (IT)

(73) Assignee: FAIVELEY TRANSPORT ITALIA S.P.A., Piossasco (IT)

( * ) Notice: Subject to any disclaimer, the term of this patent is extended or adjusted under 35 U.S.C. 154(b) by 404 days.

(21) Appl. No.: 17/050,778

(22) PCT Filed: Mar. 21, 2019

(86) PCT No.: PCT/IB2019/052294
§ 371 (c)(1),
(2) Date: Oct. 26, 2020

(87) PCT Pub. No.: WO2019/207372
PCT Pub. Date: Oct. 31, 2019

(65) Prior Publication Data
US 2021/0107442 A1    Apr. 15, 2021

(30) Foreign Application Priority Data

Apr. 27, 2018    (IT) .................. 102018000004956

(51) Int. Cl.
*B60T 17/22*    (2006.01)
*B60T 13/68*    (2006.01)
(Continued)

(52) U.S. Cl.
CPC .......... *B60T 17/228* (2013.01); *B60T 13/683* (2013.01); *B60T 8/1705* (2013.01); *B60T 13/665* (2013.01);
(Continued)

(58) Field of Classification Search
CPC ........ B60T 17/228; B60T 13/683; B60T 8/18; B60T 8/1893; B60T 8/1705;
(Continued)

(56) References Cited

U.S. PATENT DOCUMENTS 5,887,953 A * 3/1999 Wood ................... B60T 8/1893
                                                   303/7
6,095,621 A * 8/2000 Wood ................... B60T 8/1893
                                                   303/3

(Continued)

FOREIGN PATENT DOCUMENTS

| EP | 314148853 B1 | 4/2018 |
| WO | 2015181764 A1 | 5/2014 |
| WO | 2014079490 A1 | 12/2015 |

OTHER PUBLICATIONS

EN50126, "Railway applications. The specification and demonstration of reliability, availability, maintainability and safety (RAMS)" 2017, Part 1 (109 pages).

(Continued)

*Primary Examiner* — Pamela Rodriguez
(74) *Attorney, Agent, or Firm* — The Small Patent Law Group LLC; William Breeze

(57) ABSTRACT

An electro-pneumatic control system for braking, an emergency pressure monitoring and control unit providing weight signals, an emergency braking request signal, actual pressure signals, and provides emergency braking request signals, an emergency pressure module generating an emergency braking pressure, a braking control unit providing control signal pairs to generate corresponding braking pressures as a function of a service braking request signal or the emergency braking pressure request signal dependent upon whether the emergency braking request signal indicates an emergency braking request, and an emergency switching device comprising contact pairs which allow the connection (Continued)

of the control signal pairs from the braking control unit to the braking pressure generating modules when closed and prevent this connection of the control signal pairs when open.

17 Claims, 6 Drawing Sheets

(51) Int. Cl.
   *B60T 8/17* (2006.01)
   *B60T 13/66* (2006.01)

(52) U.S. Cl.
   CPC ..... *B60T 2270/413* (2013.01); *B60Y 2200/30* (2013.01)

(58) Field of Classification Search
   CPC ................ B60T 13/665; B60T 8/3235; B60T 2270/413; B60Y 2200/30
   See application file for complete search history.

(56) References Cited

U.S. PATENT DOCUMENTS

| | | | | |
|---|---|---|---|---|
| 6,250,723 | B1 * | 6/2001 | Barberis | ............... B60T 13/665 303/7 |
| 9,994,201 | B2 * | 6/2018 | Correndo | ............. B60T 13/665 |
| 2002/0163248 | A1 * | 11/2002 | Wood | .................... B60T 8/1881 303/127 |

OTHER PUBLICATIONS

EN50126, "Railway applications. The specification and demonstration of reliability, availability, maintainability and safety (RAMS)" 2017, Part 2 (83 pages).
EN50128, "Railway applications. Communications, signaling and processing systems. Software for railway control and protection systems" Mar. 11, 2001 (10 pages).
EN50129, "Railway applications. Communication, signaling and processing systems. Safety related electronic systems for signaling" Feb. 2003 (94 pages).
International Search Report dated Aug. 14, 2019 for corresponding Application No. PCT/IB2019/052294.
Written Opinion of the International Searching Authority dated Aug. 14, 2019 for corresponding Application No. PCT/IB2019/052294.

* cited by examiner

ELECTRONIC-PNEUMATIC BRAKING CONTROL SYSTEM FOR EMERGENCY AND SERVICE BRAKING FOR AT LEAST ONE VEHICLE

CROSS-REFERENCE TO RELATED APPLICATIONS

This application is a national stage entry of and claims priority pursuant to 37 C.F.R. § 1.78(d) to PCT International Application No. PCT/IB2019/052294, which was filed on 21 Mar. 2019, and which claims priority to Italian patent application number 102018000004956, which was filed on 27 Apr. 2018. The entire disclosures of these applications are incorporated herein by reference.

BACKGROUND

Technical Field

The inventive subject matter is, in general, in the field of railway braking systems; in particular, the inventive subject matter relates to an electro-pneumatic control system for emergency and service braking of a railway vehicle.

Discussion of Art

The latest railway braking systems use advanced electronic solutions in order to simplify the pneumatic architecture, especially the pneumatic portion used for emergency braking, resulting in an overall reduction in total product costs, weight reduction, increased performance, increased operational safety.

For example, the patent EP3148853 describes and claims an electro-pneumatic braking system that meets the requirements described above. In particular, this document describes and claims a pneumatic architecture and a plurality of variant embodiments.

FIG. 1 of the present application shows, for illustrative purposes, FIG. 1 of the document EP3148853. A summary description of this Figure is provided below.

WA consists of an electro-pneumatic module EPDA controlled by an electronic unit WCU, used for the continuous preparation of an emergency braking pressure i, the instantaneous value of which is linked to the instantaneous value of the weight of the bogie or the vehicle read by means of a weight sensor 2. The value is calculated by taking into account a pre-established coefficient of wheel-rail adhesion in dry conditions μ. BCA1 . . . BCAN consist of electro-pneumatic modules EPCA, controlled by electronic units BCU, used in the preparation of a service braking pressure for cylinders BC1 . . . BCN. The service braking pressure is a function of a brake-demand "a" and the weight reported by the weight sensor 2. Within the modules EPCA, the solenoid valves 10, 12 are respectively used for filling and emptying the drive chambers d of relay valves RV. By coding the control signals to the solenoid valves 10, 12, the electronic units BCU may increase, maintain, reduce the pressure to the drive chambers d and consequently the pressures to the brake cylinders BC1 . . . BCN. Said pressures may take different values over time according to the needs of the bogie or vehicle associated with the system described in FIG. 1.

Since the solenoid valves 10, 12 controlled by the BCU1 . . . BCUN are supplied by the emergency braking pressure i, the pressures generated by the modules BCA1 . . . BCAN may vary independently in a range between the zero value and the maximum value of the emergency braking pressure i.

If emergency braking is requested by means of an emergency brake input connected to the units BCU1 . . . BCN, not shown in FIG. 1, said units BCU1 . . . BCUN provide for de-energizing the solenoid valves 10 and 12, that is, placing them in the state shown in FIG. 1.

In this condition, the emergency braking pressure i is applied to the drive chambers of the pneumatic valves RV, which will duplicate said emergency braking pressure for the brake cylinders BC1 . . . BCN. In this case, contrary to what happens in the case of service braking, all the pressures to the cylinders BC1 . . . BCN will assume the same value, equivalent to the emergency braking pressure i, minus the error due to the tolerances of said pneumatic valves RV.

In the present patent application, reference will be made to the following European standards:

EN50126 ["Railway applications. The specification and demonstration of reliability, availability, maintainability and safety (RAMS)];

EN50128 ["Railway applications. Communications, signaling and processing systems. Software for railway control and protection systems"];

EN50129 ["Railway applications. Communication, signaling and processing systems. Safety related electronic systems for signaling"].

In particular, the standard EN50126 defines the methodologies for assigning SIL0/1/2/3/4 safety levels (with safety level SIL4 indicating the maximum safety level) to the subsystems comprising the examined system, based on the results of the Safety Analysis, and the standards EN50128 and EN50129 define the design criteria to be applied to the software and hardware components respectively according to the SIL levels assigned based on said results of the Safety Analysis.

These factors apply in the railway sector:

that the safety calculations relating to the emergency braking function of a railway vehicle carried out in accordance with European standard EN50126 systematically assigns a Safety Integrity Level SIL≥3 to the emergency braking function, and consequently normally to the subsystems that implement the safety calculations;

that the safety calculations relating to the service braking function for a railway vehicle carried out in accordance with European standard EN50126 normally assign a Safety Integrity Level SIL≤2 to the service braking function, and consequently normally to the subsystems that implement the safety calculations;

that the development of a control unit, typically with microprocessor or based on FPGA, according to SIL≥3 levels in accordance with EN50128 and EN50129 entails design, validation, and certification costs that are approximately an order of magnitude higher than the design according to SIL≤2 levels, while obtaining the same functions.

In relation to the last of the previous points, it is clear that it is appropriate to keep the functions to be developed according to the SIL≥3 safety levels extremely limited and simple.

As illustrated, the electronic control WCU being used to manage the emergency braking pressure will certainly have to be developed according to level SIL≥3 in accordance with standards EN50128 and EN50129. This type of development, in the context of what is claimed in EP3148853 will, however, be limited to a simple circuit based on elementary microprocessors and/or FPGA. The circuit is assigned to the calculation of the emergency braking pressure i and to the driving of the two solenoid valves 5 and 6 and to the reading of the feedback pressure sensor 9 to obtain the emergency braking pressure i through a simple closed chain control.

It is evident that, disadvantageously, the system described in EP3148853 may only produce a single common value of emergency braking pressure for the various brake cylinders BC1 . . . BCN.

There are railway applications where an emergency and service braking system must produce different emergency braking pressures for each brake cylinder BC1 . . . BCN. For example, but not exclusively, different emergency braking values are required when, in the system described in EP3148853, the symbols BC1 . . . BCN, limited to BC1, BC2, represent two pressure channels to be assigned to two different bogies of a same body, where one bogie is motorized and the other is a towed bogie, or when two adjacent JAKOBS bogies must be braked. In both cases, the two bogies will generally generate different braking weights, including in the case of emergency braking. In such case, the system described in EP3148853, generating equal emergency braking values for each channel BC1, BC2, is no longer adequate.

One solution could be to duplicate the module WA for each module BCA1, BC2, where each module WA1, WA2, would receive a weight value from its own weight sensor 2 relative to its own bogie, and would generate an independent emergency braking pressure, specific to each bogie, for each respective module BCA1, BCA2.

This solution, however, is not viable because it would go against the requirements of having a system characterized by minimal cost, size, and weight.

A second solution could be to develop the modules BCA1 . . . BCAN according to level SIL≥3 in accordance with EN50128 and EN50129, entrusting directly to said modules BCA1 . . . BCAN the generation and control of each emergency braking pneumatic pressure independently for each bogie.

This solution is also not viable because the units BCA1 . . . BCAN are extremely complex as the units are used to control various functions in addition to producing the service braking pressure (i.e. antiskid functions, diagnostic functions, serial communication functions on complex protocols such as Ethernet). Such hardware and software complexity would result in unfeasible costs if the development were performed according to SIL≥3 safety levels in accordance with EN50128 and EN50129.

BRIEF SUMMARY

One embodiment of the inventive subject matter includes an electro-pneumatic control system for emergency and service braking, particularly for at least one railway vehicle, that allows the independent control of emergency pressures for each channel according to an SIL≥3 safety level, without increasing the complexity and overall cost of the system compared to systems similar to that which is described (for example, in EP3148853).

The system further can be able to provide an emergency braking pressure common to all channels in the event of localized failure on one of the components making up the system.

An electronic control system for the emergency braking of a railway vehicle having the characteristics defined in the independent claims is provided. However, not all embodiments of the inventive subject matter are limited to railway vehicles. At least one embodiment may be used to apply brakes to slow or stop movement in a non-emergency situation. Additionally, at least one embodiment may be used to apply brakes to slow or stop movement of a vehicle other than a rail vehicle, such as a bus, truck, agricultural vehicle, automobile, mining vehicle, or the like.

BRIEF DESCRIPTION OF THE DRAWINGS

The functional and structural characteristics of some embodiments of an electronic control system for emergency and service braking according to the inventive subject matter will now be described. Reference is made to the accompanying drawings, wherein.

DETAILED DESCRIPTION

Figure 1:
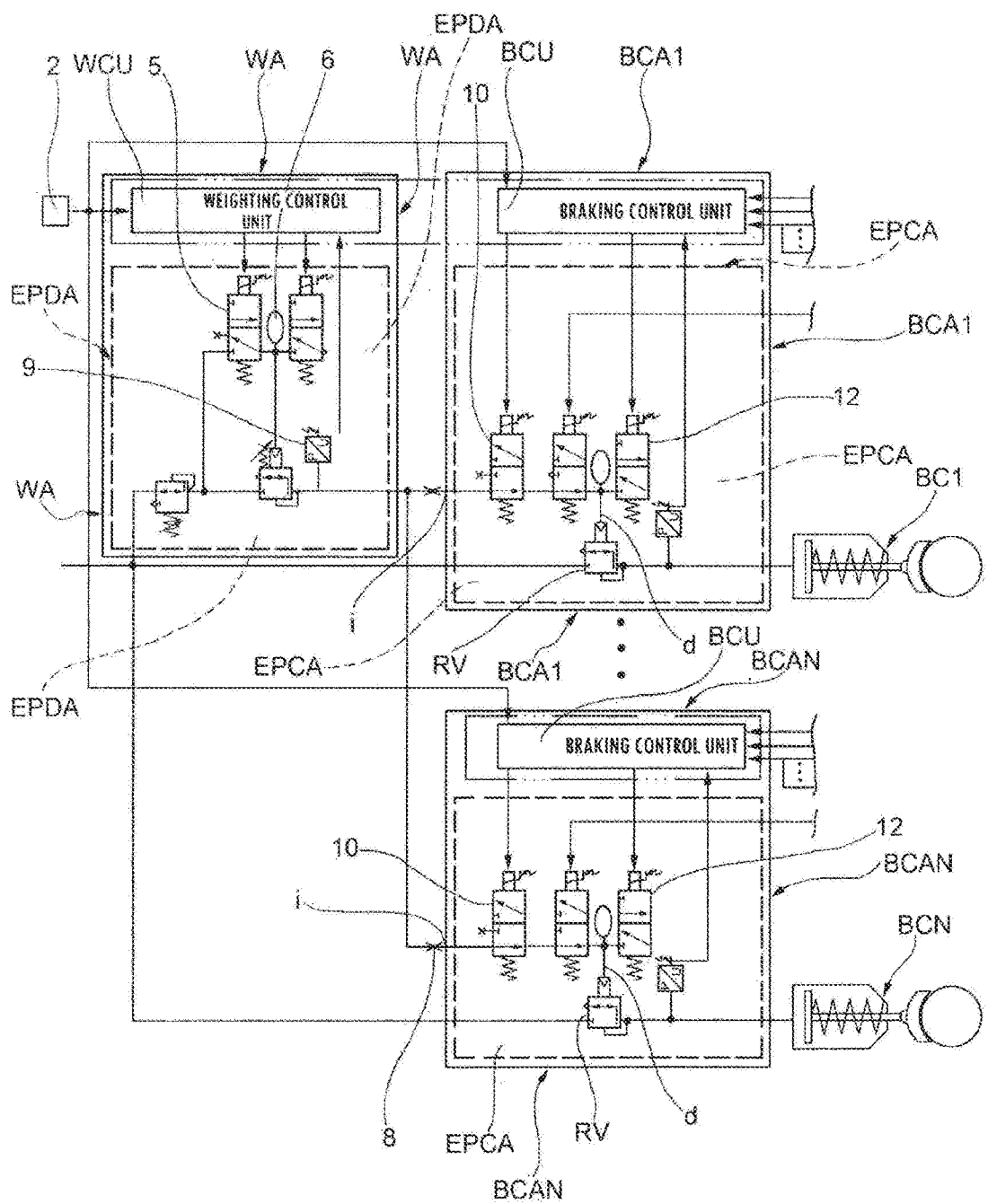
FIG. 1 illustrates a pneumatic braking system integrating service and emergency braking (e.g., as described in EP3148853)

Before explaining a plurality of embodiments of the inventive subject matter in detail, it should be clarified that the inventive subject matter is not limited in its application to the details of construction and to the configuration of the components presented in the following description or illustrated in the drawings. The inventive subject matter may assume other embodiments and may be implemented or achieved in essentially different ways. It should also be understood that the phraseology and terminology have descriptive purposes and should not be construed as limiting. The use of "include" and "comprise" and the variations thereof are to be understood as encompassing the elements stated hereinafter and the equivalents thereof, as well as additional elements and the equivalents thereof.

Figure 3:
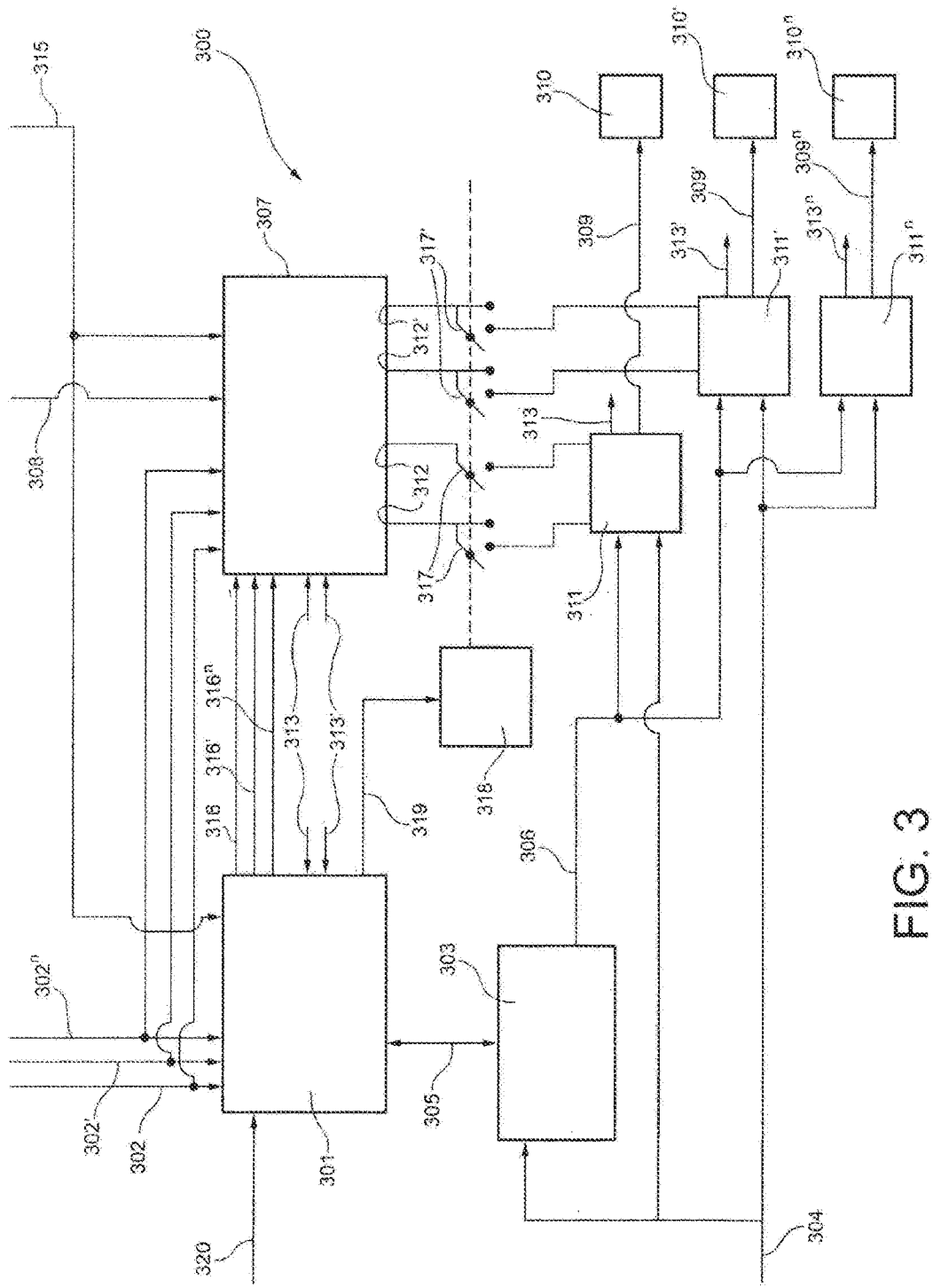
FIG. 3 illustrates a first embodiment of an electronic control system for emergency and service braking.

Referring to FIG. 3, an electro-pneumatic control system for emergency and service braking 300 is illustrated, particularly for at least one railway vehicle comprising a plurality of bogies, according to a first embodiment of the inventive subject matter. Alternatively, the vehicle may be a vehicle other than a rail vehicle.

This electro-pneumatic control system 300 for emergency and service braking comprises a plurality of electro-pneumatic braking pressure generating modules 311, 311', . . . 311*n* arranged to generate respective braking pressures 309, 309', . . . 309*n* for respective braking units 310, 310', . . . 310*n*.

These electropneumatic modules for generating braking pressure 311, 311', . . . 311*n* are powered by a pneumatic supply pressure 304, coming, for example, from an auxiliary tank.

Each electro-pneumatic module for generating braking pressure 311, 311', . . . 311*n* may assume, by way of example but not exclusively, the embodiment typical of the electro-pneumatic modules EPCA shown in FIG. 1.

Figure 2:
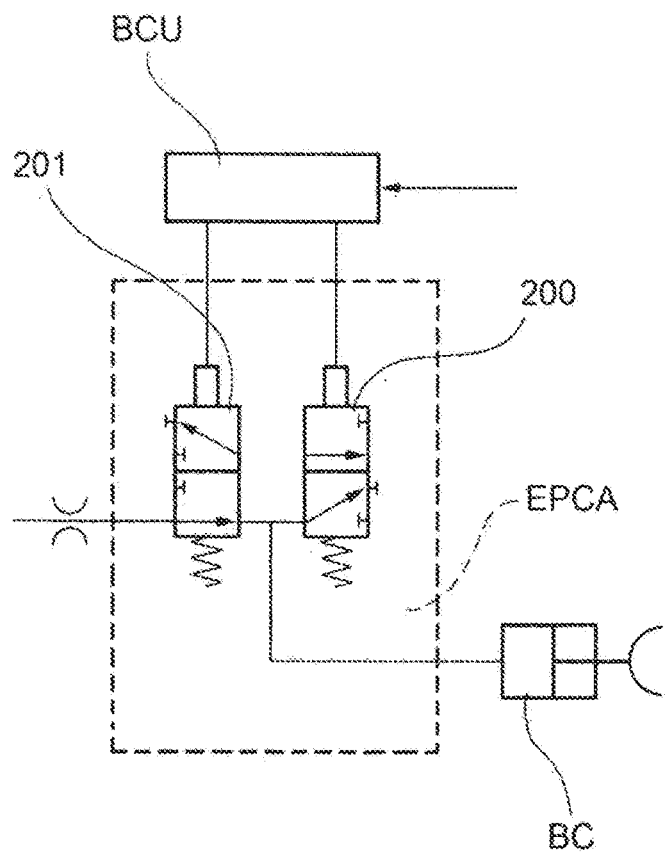
FIG. 2 shows a possible, but not exclusive, alternative solution for a module EPCA.

In addition, each electro-pneumatic braking pressure generating module 311, 311', . . . 311*n* may take, by way of example but not exclusively, the embodiment typical of the electro-pneumatic modules EPCA illustrated in FIG. 2: within the module EPCA, the solenoid valves 200, 201, are respectively used for directly filling and emptying the cylinder BC. By means of appropriate coding of the control signals to the solenoid valves 200, 201, the electronic unit BCU may increase, maintain, reduce the pressure directly to the brake cylinders BC.

In FIG. 3, two or more electrical signal pairs 312, 312', . . . 312n may provide for driving solenoid valves inside each electro-pneumatic module for generating pneumatic braking pressure 311, 311', . . . 311n, said solenoid valves not being illustrated in FIG. 3. The functional mode of said solenoid valves is similar to that described in FIG. 1 and FIG. 2 for modules EPCA.

The electro-pneumatic control system for emergency and service braking 300 further comprises an emergency pressure control and monitoring unit 301 arranged to receive a plurality of weight signals 302, 302', . . . 302n indicating the weights acting on the corresponding bogies, an emergency braking request signal 315 adapted to signal an emergency braking request, a plurality of actual pressure signals 313, 313', . . . 313n indicating pressure values assumed respectively by the pneumatic braking pressures 309, 309', . . . 309n generated respectively by the module for generating braking pressure 311, 311', . . . 311n.

The actual pressure signals 313, 313', . . . 313n are generated, for example, by pressure sensors, which are each arranged to read the braking pressures 309, 309', . . . 309n.

The emergency braking request signal 315 may, for example, come from an emergency loop of the railway vehicle.

The emergency pressure control and monitoring unit 301 is further arranged to generate a plurality of emergency braking pressure request signals 316, 316', . . . 316n continuous or repeated in a non-continuous manner in time. The emergency braking pressure request signals 316, 316', . . . 316n each being calculated on the basis of the instantaneous value of the corresponding signals 302, 302', . . . 302n indicative of the weights acting on the corresponding bogies, and of a pre-established coefficient of wheel-rail adhesion in dry conditions $\mu$.

The emergency pressure monitoring and control unit 301 may also be arranged to receive a speed signal 320 indicating the instantaneous speed of the vehicle, in addition to the aforesaid plurality of weight signals 302, 302', . . . 302n indicating the weights acting on the corresponding bogies, the emergency braking request signal 315 adapted to signal an emergency braking request, and the plurality of actual pressure signals 313, 313', . . . 313n indicating the pressure values assumed respectively by the pneumatic braking pressures 309, 309', . . . 309n generated respectively by the braking pressure generating modules 311, 311', . . . 311n.

The emergency pressure control and monitoring unit 301 may be arranged to generate a plurality of emergency braking pressure request signals 316, 316', . . . 316n continuous in time. Each of these signals may be calculated on the basis of the instantaneous value of the corresponding signals 302, 302', . . . 302n indicating the weights acting on the corresponding bogies, and a pre-established coefficient of wheel-rail adhesion in dry conditions $\mu$. The value of this coefficient can be obtained in real time from a function performed by the emergency pressure monitoring and control system 301, the coefficients of which are resident in the non-volatile memory of the monitoring and control system 301. The function can represent the mapping of the values of the wheel-rail adhesion coefficient in dry conditions $\mu$ as a function of the speed of the train indicated by the speed signal 320.

The emergency pressure control and monitoring unit 301 is an electronic architecture.

The electro-pneumatic control system for emergency and service braking 300 further comprises an emergency pressure generating module 303, powered by the supply pressure 304. This emergency pressure generating module 303 is arranged to generate an emergency braking pressure 306 to be supplied to a plurality of electropneumatic braking pressure generating modules 311, 311', . . . 311n.

For example, the supply pressure 304 may be provided by an auxiliary tank.

Furthermore, the electro-pneumatic control system for emergency and service braking 300 includes a braking control unit 307 arranged to receive the weight signals 302, 302', . . . 302n, the emergency braking request signal 315, a service braking request signal 308 (the value of which indicates the service braking request level), the actual pressure signals 313, 313', . . . 313n, and the emergency braking pressure request signals 316, 316', . . . 316n.

The emergency braking pressure request signals 316, 316', . . . 316n generated by the emergency braking pressure control and monitoring unit 301 are transmitted to the braking control unit 307, for example, but not exclusively, through a serial communication means or by a set of analogue signals, in voltage or in current or pulse wave modulation (PWM).

The brake control unit 307 is arranged to provide control signal pairs 312, 312', . . . 312n. By appropriate coding of the control signal pair 312, 312', . . . 312n, the braking control unit 307 may increase, maintain, reduce the braking pressures 309, 309', . . . 309n.

The increase, maintenance, and reduction of the braking pressures 309, 309', . . . 309n may be obtained by driving the solenoid valves belonging to the electro-pneumatic braking pressure generating modules 311, 311', . . . 311n, as described above.

The braking control unit 307 is also an electronic architecture. The electronic architecture of the braking control unit 307 is independent of the electronic architecture of the emergency pressure control and monitoring unit 301. For example, each of the units 301, 307 may be formed from one or more circuits that are separate from and not conductively coupled with the circuit(s) of the other unit 301, 307. Stated differently, each of the units 301, 307 may be operate without any electric current or voltage being conducted between the units 301, 307.

Again referring to FIG. 3, the electro-pneumatic control system for emergency and service braking 300 includes a first emergency switching device 318 comprising several contact pairs 317, 317', . . . 317n connected between the braking control unit 307 and the braking pressure generating modules 311, 311', . . . 311n.

The first emergency switching device 318 is controlled by a drive signal 319 generated by the emergency pressure control unit 301.

The contact pairs 317, 317', . . . 317n are adapted to allow the connection of the control signal pairs 312, 312', . . . 312n from the braking control unit 307 to the respective braking pressure generating modules 311, 311', . . . 311n when the contact pairs 317, 317', . . . 317n are placed in a closed condition, thereby allowing the braking control unit 307 to control the braking pressure generating modules 311, 311', . . . 311n to obtain the application, maintenance, and/or release of the braking pressures 309, 309', . . . 309n.

The contact pairs 317, 317', ... 317n are to prevent the connection of the control signal pairs 312, 312',...312n from the braking control unit 307 to the respective braking pressure generating modules 311, 311', ... 311n when the contact pairs 317, 317', ... 317n are placed in an open condition, thus forcing the braking pressure generating modules 311, 311', ... 311n to transfer the emergency braking pressure value 306 to the braking pressures 309, 309', ... 309n.

In one embodiment, the contact pairs 317, 317', ... 317n of the first emergency switching device 318 may be placed in a closed condition by the emergency pressure control unit 301 when the emergency braking request signal 315 does not indicate an emergency braking request, and when the emergency braking request signal 315 indicates an emergency braking request and the actual pressure signal values 313, 313', ... 313n indicative of the braking pressure values 309, 309', ... 309n correspond to the respective emergency braking pressure request signal values 316, 316', ... 316n.

The contact pairs 317, 317', ... 317n of the first emergency switching device 318 may be placed in a normally open condition by the emergency pressure control unit 301 when the emergency braking request signal 315 indicates an emergency braking request and at least one of the actual pressure signal values 313, 313', ... 313n (indicative of the braking pressure value 309, 309', ... 309n) does not correspond to the respective signal among the emergency braking pressure request signals 316, 316', ... 316n. In this way, the connection of the control signals 312, 312', ... 312n is interrupted by the braking control unit 307 to the electro-pneumatic braking pressure generating modules 311, 311', ... 311n. Consequently, the solenoid valves of the braking pressure generating modules 311, 311', ... 311n are forced into the unpowered condition and thus forced to transfer the emergency braking pressure value 306 supplied by the emergency pressure module 303 to the braking pressures 309, 309', ... 309n.

Figure 4:
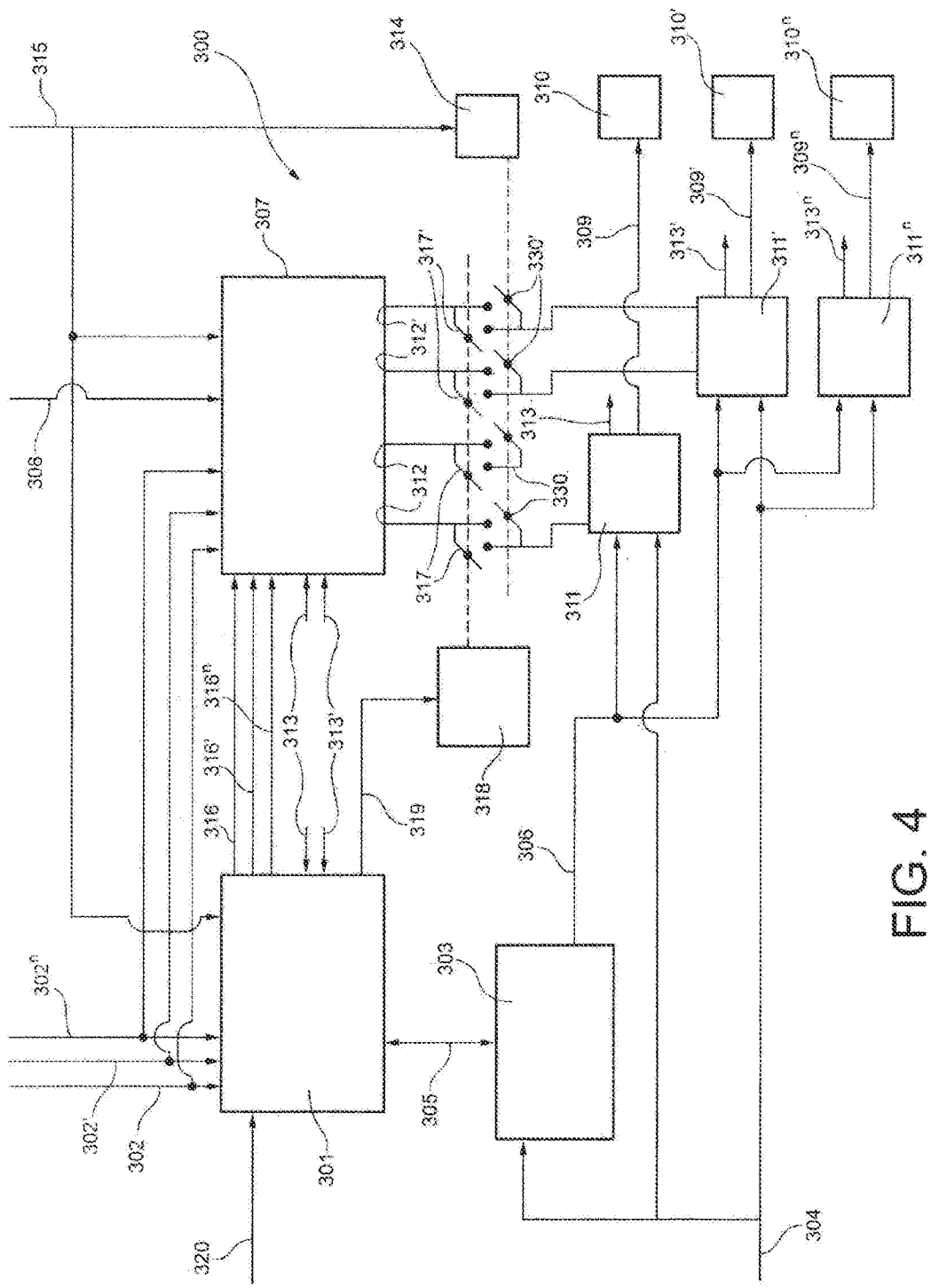
FIG. 4 illustrates a second embodiment of an electronic control system for emergency and service braking.

Referring now to FIG. 4, in a further embodiment, the electro-pneumatic control system for emergency and service braking may further comprise a second emergency switching device 314 which comprises a plurality of contact pairs 330, 330', ... 330n and is controlled by the emergency braking request signal 315.

The contact pairs 330, 330', ... 330n of the second emergency switching device 314 are connected between the braking control unit 307 and the braking pressure generating modules 311, 311', ... 311n, and are placed in parallel with the respective contact pairs 317, 317', ... 317n of the first emergency switching device 318.

The contact pairs 330, 330', ... 330n of the second emergency switching device 314 are placed in a closed condition when the emergency braking request signal 315 assumes a value which does not indicate a request for emergency braking, and are placed in a condition normally open when the emergency braking request signal 315 has a value that indicates an emergency braking request.

As may be seen in FIG. 4, the closed condition of the contacts 330, 330', ... 330n allows the connection of the control signal pairs 312, 312', ... 312n from the braking control unit 307 to the electro-pneumatic braking pressure generating modules 311, 311', ... 311n, thus allowing the braking control unit 307 to increase, maintain, reduce the braking pressures 309, 309',... 309n, independently of each other, as described above.

The open condition of the contacts 330, 330', ... 330n prevents the connection of the control signal pairs 312, 312', ... 312n from the braking control unit 307 to the braking pressure generating modules 311, 311', ... 311n. In this way, the control of the electro-pneumatic braking pressure generating modules 311, 311', ... 311n by the braking control unit 307 is prevented. In this condition, the electro-pneumatic braking pressure generating modules 311, 311', ... 311n assume the unpowered condition illustrated in FIG. 4, transferring the pressure value assumed by the emergency pressure 306 to the braking pressures 309, 309', ... 309n.

In this embodiment, the contact pairs 317, 317', ... 317n of the first emergency switching device 318 are indifferently open or closed via the drive signal 319 when the emergency braking request signal 315 does not indicate an emergency braking request. For example, the contact pairs 330, 330', ... 330n of the second emergency switching device 314 are placed in a closed condition when the emergency braking request signal 315 assumes a value which does not indicate a request for emergency braking. In this way, the closed condition of the contacts 330, 330', ... 330n allows the connection of the control signal pairs 312, 312', ... 312n from the braking control unit 307 to the electro-pneumatic braking pressure generating modules 311, 311', ... 311n. Accordingly, it may not be important whether the contact pairs 317, 317', ... 317n of the first emergency switching device 318 are open or closed via the drive signal 319 when the emergency braking request signal 315 does not indicate an emergency braking request. The closed condition of the contacts 330, 330', ... 330n allows (in any case) the connection of the control signal pairs 312, 312', ... 312n from the braking control unit 307 to the electro-pneumatic braking pressure generating modules 311, 311', ... 311n, regardless of whether contact pairs 317, 317', ... 317n of the first emergency switching device 318 are open or closed.

The contact pairs 317, 317', ... 317n of the first emergency switching device 318 are placed in a closed condition when the emergency braking request signal 315 indicates an emergency braking request and the values of the actual pressure signals 313, 313', ... 313n (indicative of the braking pressure values 309, 309', ... 309n) correspond to the values of the respective emergency braking pressure request signals 316, 316', ... 316n.

The contact pairs 317, 317', ... 317n of the first emergency switching device 318 are placed in a normally open condition by the emergency pressure control unit 301 when the emergency braking request signal 315 indicates an emergency braking request and at least one of the values of the actual pressure signal 313, 313', ... 313n (indicative of the braking pressure value 309, 309', ... 309n) does not correspond to the respective signal among the emergency braking pressure request signals 316, 316', ... 316n.

In other words, when the contact pairs 317, 317', ... 317n are closed, the connection of the control signal pairs 312, 312', ... 312n from the brake control unit 307 to the pneumatic braking pressure generating modules 311, 311', ... 311n is permitted, so as to transfer the value of the emergency braking pressure request signals 316, 316', ... 316n to the corresponding braking pressures 309, 309', ... 309n.

Consequently, when the contact pairs 317, 317', ... 317n are open, the braking generating pressure modules 311, 311', ... 311n are forced into the unpowered condition shown in FIG. 4 and thus forced to transfer the emergency braking pressure value 306 supplied by the emergency pressure module 303 to the braking pressures 309, 309', ... 309n.

The first and second switching devices 314, 318 may be, for example, relays or also obtained with solid state components, possibly by opto-isolators for galvanic decoupling between the emergency braking request signal 315 and the signals coming out of the braking control unit 307.

Since the emergency pressure 306 constitutes the common supply pressure of the solenoid valves belonging to all braking pressure generating modules 311, 311', ... 311n, the modules 311, 311', ... 311n may generate a maximum pressure value equivalent to the emergency braking pressure value 306. Consequently, and considering that the emergency pressure value for each braking channel normally represents the maximum value that may be reached by the service braking for each of the channels, the emergency braking pressure 306 may at all times assume a value at least equal to or greater than the highest of the emergency pressure requests 316, 316', ... 316n.

Figure 5:
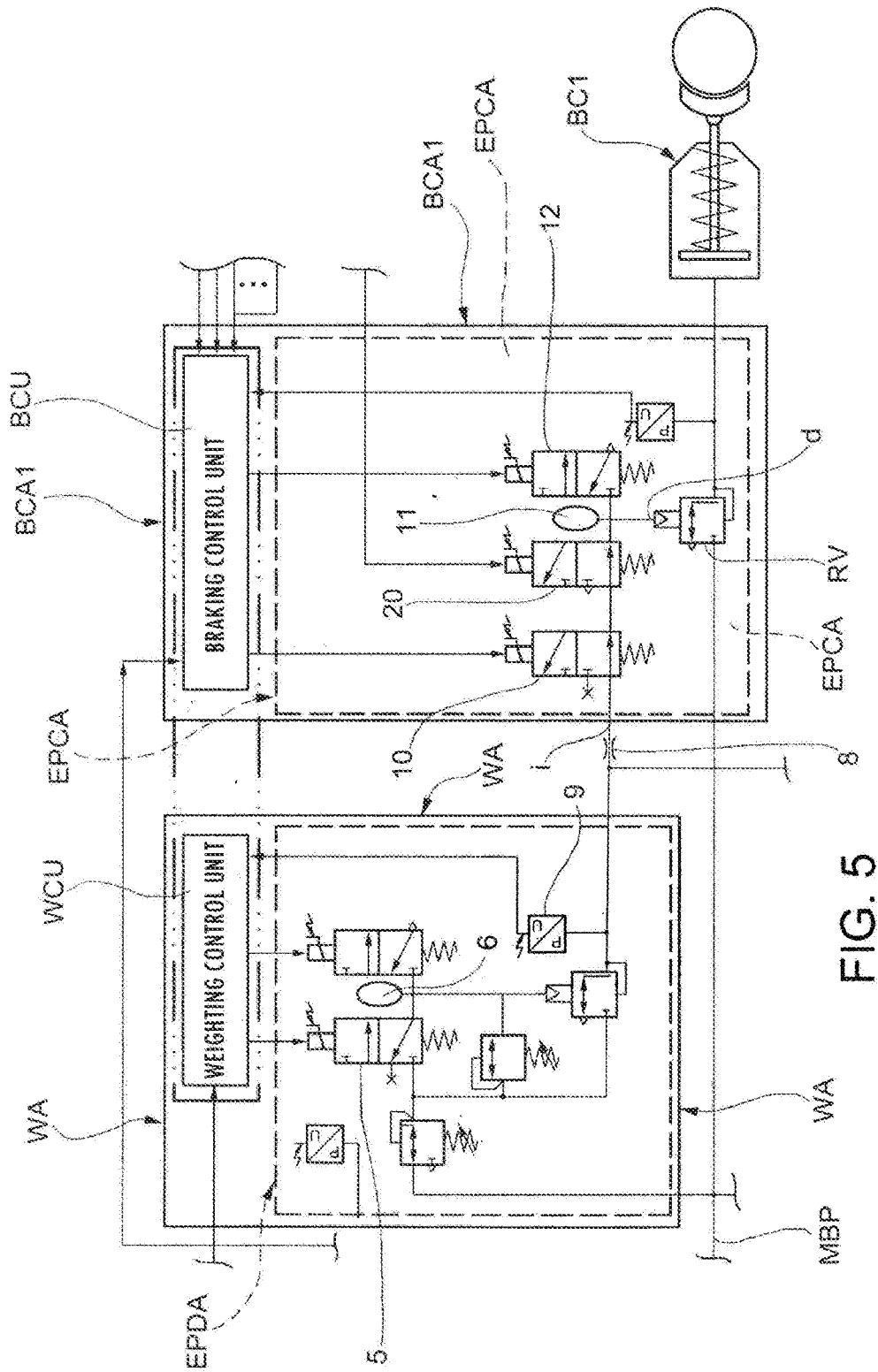
FIG. 5 illustrates in a simplified way pneumatic modules EPDA manufactured according to a further illustrative solution (e.g., as described in EP3148853)
Figure 6:
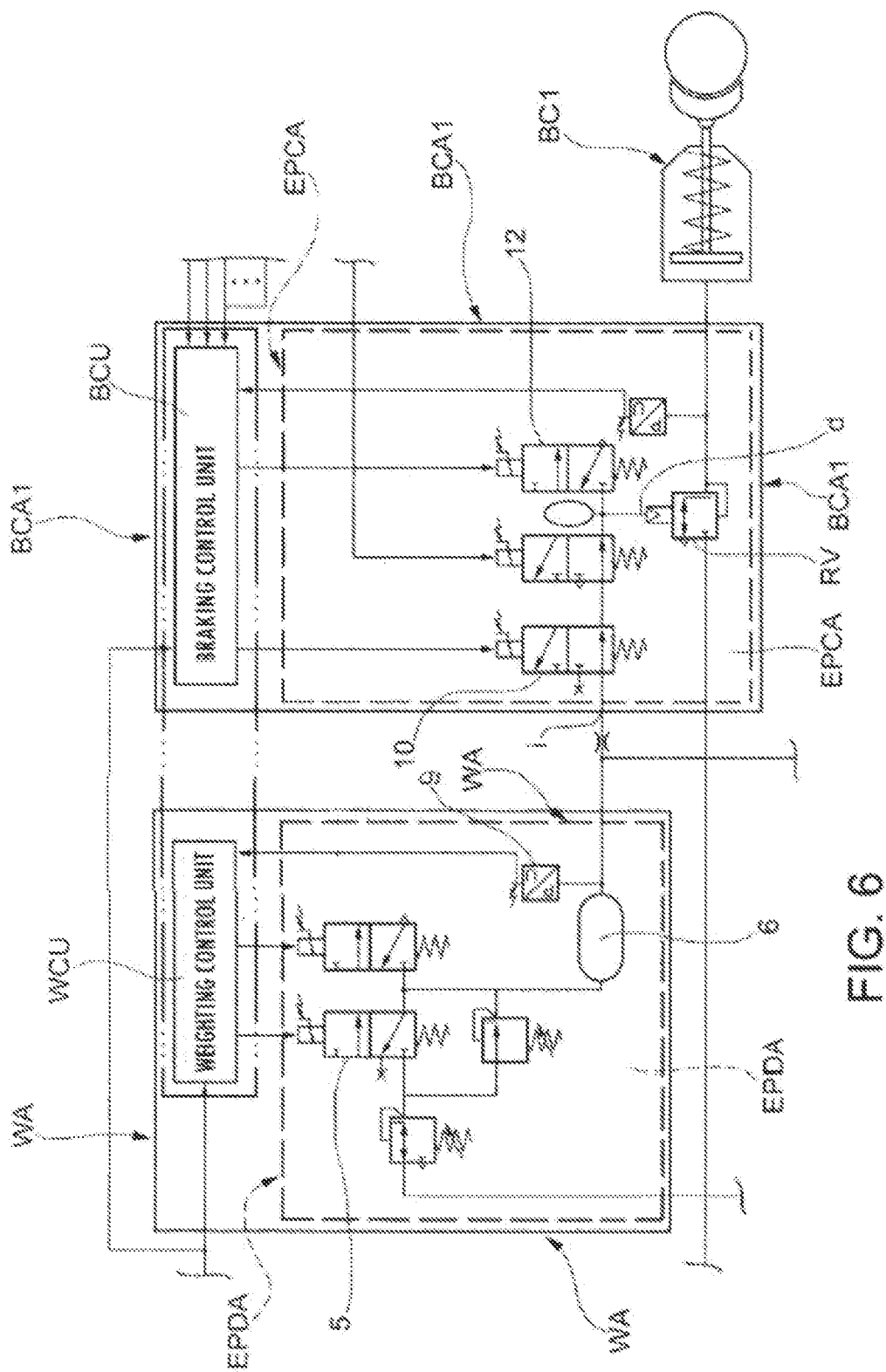
FIG. 6 shows pneumatic modules EPDA manufactured according to a still further illustrative solution (e.g., as described in EP3148853).

This object may be achieved by assigning to the emergency pressure module 303, for example but not exclusively, a form equivalent to the pneumatic modules EPDA in FIG. 1, or FIG. 5, or FIG. 6.

The emergency pressure module 303 is controlled by the emergency pressure control and monitoring module 301, by the control and feedback signals 305, representing in FIG. 1 the control signals of the solenoid valves 5, 7, and by the feedback signal coming from the pressure sensor 9. The control function is adapted to prepare the emergency pressure 306 in a continuous way over time. The emergency pressure control and monitoring module 301 provides for controlling the emergency pressure module 303 by assuming, at any time, the greater value among the emergency braking pressure request values 316, 316', ... 316n, at the emergency braking pressure 306. The values being at any time calculated according to the weights 302, 302', ... 302n and possibly according to the maximum available adhesion value as a function of the instantaneous speed of the vehicle indicated by the speed signal 320.

the emergency pressure module 303 may be a pneumatic module obtained through a pneumatic valve to generate a constant emergency braking pressure value 306.

A second, but not exclusive, illustrative method for generating the emergency braking pressure 306 includes using a pressure relief valve for obtaining the emergency pressure module 303, permanently calibrating the pressure relief valve to the pressure value corresponding to the greater of the possible emergency pressure values assumed at maximum weight. The value of which is calculated at the design stage of the system. In the case of the embodiment described above, the control and feedback signals 305 will be reduced to a simple feedback function for the continuous monitoring of the pressure 306.

Advantageously, the relatively simple emergency pressure control and monitoring unit 301, may be developed according to SIL≥3 safety levels referred to in the standards EN50128 and EN50129, and the braking control unit 307, extremely more complex, may be developed according to SIL≤2 safety levels referred to in the standards EN50128 and EN50129.

Thus, even though the braking control unit 307 is designed according to SIL≤2 safety levels and is therefore not suitable to handle emergency braking independently, the braking control unit 307 may carry out the management of emergency pressures under continuous control and monitoring by the emergency pressure control and monitoring unit 301, the latter being designed according to SIL≥3 safety levels. As described above, during emergency braking, the emergency pressure control and monitoring unit 301 checks that the values of the braking pressures 309, 309', ... 309n are those expected (e.g., the values of the braking pressures 309, 309', ... 309n correspond to the respective values 316, 316', ... 316n, within the pre-established tolerances). If the braking pressures 309, 309', ... 309n do not correspond to the expected values (e.g., the braking pressures 309, 309', ... 309n correspond to the respective values 316, 316', ... 316n, within said margins of tolerance), a possible malfunction of the braking control unit 307 is identified "safely" by the emergency pressure control and monitoring unit 301, which will further "safely" bring the braking pressures 309, 309', ... 309n to the value of the emergency braking pressure 306, by de-energizing the first and second switching devices 318, 314.

Braking groups 310, 310', ... 310n may each provide for braking different axles of the same railway vehicle. Otherwise, the braking groups 310, 310', ... 310n may each brake different bogies of the same railway vehicle or train of railway vehicles.

The embodiments described above therefore allow one to differentiate the output pressures to the system according to the different weights on the different bogies even during emergency braking, according to the overall SIL≥3 safety level due to continuous monitoring and the backup solution in case of failure of the braking control unit 307, provided by the emergency pressure control and monitoring unit 301 designed to operate at the SIL≥3 safety level.

Different aspects and embodiments of an electro-pneumatic control system for emergency and service braking have been described, particularly for at least one railway vehicle according to the inventive subject matter. It is understood that each embodiment may be combined with any other embodiment. The inventive subject matter, moreover, is not limited to the described embodiments, but may vary within the scope defined by the accompanying claims.

What is claimed is:

1. A control system for vehicle braking, the control system comprising:
a plurality of braking pressure generating modules configured to be supplied by a supply pressure, the plurality of braking pressure generating modules configured to generate a plurality of respective braking pressures for respective braking groups;
an emergency pressure control and monitoring unit configured to receive a plurality of weight signals indicative of weights acting on one or more bogies, an emergency braking request signal configured to signal an emergency braking request, and a plurality of pressure signals indicative of pressure values of the respective braking pressures generated by the respective braking pressure generating modules;
wherein the emergency pressure control and monitoring unit is configured to provide a plurality of emergency braking pressure control signals over time indicating emergency braking pressure request values for the respective braking pressure generating modules;
an emergency pressure module configured to be supplied by the supply pressure, the emergency pressure module configured to generate an emergency braking pressure to be supplied to the braking pressure generating modules; and
a braking control unit configured to receive the plurality of weight signals, the emergency braking request signal, a service braking request signal indicating a level of service braking request, the pressure signals, and the plurality of emergency braking pressure control signals generated by the emergency pressure control and monitoring unit and configured to indicate the emergency braking pressure request value for each of the braking pressure generating modules;

wherein the braking control unit is configured to provide a plurality of control signal pairs to control the respective braking pressure generating modules to generate corresponding braking pressures as a function of a first value of the service braking request signal and of a corresponding weight signal of the plurality of weight signals, responsive to the emergency braking request signal not indicating an emergency braking request, and to generate braking pressures as a function of the emergency braking pressure request values of the emergency braking pressure control signals responsive to the emergency braking request signal having a second value indicating the emergency braking request.

2. The control system of claim 1, wherein a first emergency switching device comprising a plurality of first contact pairs connected between the braking control unit and the braking pressure generating modules;

the first emergency switching device configured to be controlled by a drive signal generated by the emergency pressure control and monitoring unit;

the first contact pairs configured to allow connection of the control signal pairs from the braking control unit to the respective braking pressure generating modules responsive to the first contact pairs being placed in a closed condition to allow the braking control unit to control the braking pressure generating modules to obtain application, maintenance, or release of braking pressures;

the first contact pairs configured to prevent connection of the control signal pairs from the braking control unit to the respective braking pressure generating modules responsive to the first contact pairs being placed in an open condition to cause the braking pressure generating modules to transfer the emergency braking pressure to the braking pressures.

3. The control system of claim 2, wherein the first the contact pairs of the first emergency switching device are placed in a closed condition by the emergency pressure control and monitoring unit responsive to the emergency braking request signal not indicating an emergency braking request, and responsive to the emergency braking request signal indicating an emergency braking request and the pressure values of actual pressure signals indicative of the pressure values of the braking pressures correspond to the respective emergency braking pressure request values of the emergency braking pressure request signals;

wherein the first contact pairs of the first emergency switching device are placed in the open condition by the emergency pressure control and monitoring unit responsive to the emergency braking request signal indicating an emergency braking request and at least one of the pressure values of the actual pressure signals not corresponding to the respective emergency braking pressure value among the emergency braking pressure values of the emergency braking pressure request signals.

4. The control system of claim 2, wherein the first emergency switching device includes one or more relay or solid state components.

5. The control system of claim 1, the emergency pressure control and monitoring unit has an electronic architecture and wherein the braking control unit has an electronic architecture that is independent from the electronic architecture of the emergency pressure control and monitoring unit.

6. The control system of claim 1, further comprising:

a second emergency switching device which comprises a plurality of second contact pairs and is configured to be controlled by the emergency braking request signal;

the second contact pairs of the second emergency switching device connected between the braking control unit and the braking pressure generating modules, the second contact pairs placed in parallel with respective first contact pairs of a first emergency switching device;

the second contact pairs of the second emergency switching device placed in a closed condition responsive to the emergency braking request signal having the emergency braking pressure value which does not indicate an emergency braking request for, and the second contact pairs are placed in an open condition responsive to the emergency braking request signal having the emergency braking pressure value that indicates the emergency braking request;

the first contact pairs of the first emergency switching device configured to be indifferently open or closed via a drive signal responsive to the emergency braking request signal not indicating the emergency braking request;

the first contact pairs of the first emergency switching device configured to be placed in a closed condition responsive to the emergency braking request signal indicating the emergency braking request and the pressure values of actual pressure signals correspond to the emergency braking pressure values of the respective emergency braking pressure request signals;

the first contact pairs of the first emergency switching device configured to be placed in an open condition by the emergency pressure control and monitoring unit responsive to the emergency braking request signal indicating the emergency braking request and at least one of the pressure values of the actual pressure signals does not correspond to the respective emergency braking pressure value.

7. The control system of claim 1, wherein the emergency pressure module is a pneumatic module that includes a pneumatic valve configured to generate a constant value for the emergency braking pressure value.

8. The control system of claim 7, wherein the emergency pressure control and monitoring unit is configured to calculate the emergency braking pressure value in real time according to a largest weight among the plurality of weight signals and a second coefficient of wheel-rail adhesion in dry conditions that is calculated in real time by the emergency pressure control and monitoring unit as a function of an instantaneous speed value of the vehicle indicated by a speed signal.

9. The control system of claim 1, wherein the emergency pressure module is a pneumatic module that includes a pneumatic valve adapted to generate a constant value for the emergency braking pressure value and corresponding to an emergency pressure relative to a largest weight of the weights acting on the bogies.

10. The control system of claim 1, wherein the emergency pressure module is an electro-pneumatic emergency pressure module configured to generate the emergency braking pressure value as a function of control and feedback signals generated by the emergency pressure control and monitoring unit; the control and feedback signals being exchanged between the emergency pressure control and monitoring unit and the electro-pneumatic emergency pressure module.

11. The control system of claim 1, wherein the emergency pressure control and monitoring unit is configured to calculate the emergency braking pressure value in real time according to a largest weight among the plurality of weight signals and a predefined first coefficient of wheel-rail adhesion in dry conditions that is characteristic of contact between a wheel and a rail.

12. The control system of claim 1, wherein each of the braking groups is configured to brake a different axle of a same vehicle.

13. The control system of claim 1, wherein each of the braking groups is configured to brake different bogies of a same vehicle or of a same train of railway vehicles.

14. The control system of claim 1, wherein the emergency pressure control and monitoring unit is configured to operate according to SIL>3 safety levels in EN50128 and EN50129 standards.

15. The control system of claim 1, wherein the braking pressure control unit is configured to operate according to SIL<2 safety levels in EN50128 and EN50129 standards.

16. The control system of claim 1, wherein the emergency pressure control and monitoring unit is configured to transfer the emergency braking pressure request values to the braking control unit by a serial communication channel.

17. The control system of claim 1, wherein the emergency pressure control and monitoring unit is configured to transfer the emergency braking pressure request values to the braking control unit by one or more of an analog discrete voltage signals, an analog discrete current signals, or a pulse width modulation.

\* \* \* \* \*